US008968858B2

(12) United States Patent
Bihari et al.

(10) Patent No.: US 8,968,858 B2

(45) Date of Patent: Mar. 3, 2015

(54) PRINTABLE MOLDED ARTICLES MADE FROM A POLYOXYMETHYLENE POLYMER COMPOSITION

(71) Applicant: Ticona LLC, Florence, KY (US)

(72) Inventors: Malvika Bihari, Florence, KY (US); Robert Gronner, Erlanger, KY (US); Lowell Larson, Independence, KY (US)

(73) Assignee: Ticona LLC, Florence, KY (US)

( * ) Notice: Subject to any disclaimer, the term of this patent is extended or adjusted under 35 U.S.C. 154(b) by 47 days.

(21) Appl. No.: 13/721,268

(22) Filed: Dec. 20, 2012

(65) Prior Publication Data

US 2013/0171430 A1 Jul. 4, 2013

Related U.S. Application Data

(60) Provisional application No. 61/581,805, filed on Dec. 30, 2011.

(51) Int. Cl.

| | |
|---|---|
| ***B41M 5/00*** | (2006.01) |
| ***B44C 1/17*** | (2006.01) |
| ***G03G 7/00*** | (2006.01) |
| ***C08L 75/04*** | (2006.01) |
| ***B32B 3/14*** | (2006.01) |
| ***B32B 27/38*** | (2006.01) |
| ***B32B 3/10*** | (2006.01) |
| ***B32B 27/40*** | (2006.01) |
| ***C08L 63/00*** | (2006.01) |
| ***B32B 27/36*** | (2006.01) |
| ***B32B 27/08*** | (2006.01) |
| ***C08J 7/04*** | (2006.01) |

(52) U.S. Cl.

CPC . *C08L 75/04* (2013.01); *B32B 3/14* (2013.01); *B32B 27/38* (2013.01); *B32B 3/10* (2013.01); *B32B 27/40* (2013.01); *C08L 63/00* (2013.01); *B32B 27/36* (2013.01); *B32B 27/08* (2013.01); *C08J 7/047* (2013.01); *C08J 2359/00* (2013.01); *C08J 2400/24* (2013.01); *C08J 2475/04* (2013.01); *C08J 2463/04* (2013.01)

USPC ........ 428/195.1; 428/323; 428/412; 428/413; 428/422.8; 428/423.1; 428/480

(58) Field of Classification Search

CPC .......... B32B 3/10; B32B 27/08; B32B 27/36; B32B 27/38; B32B 27/40; C08L 63/00

USPC ........ 428/195.1, 323, 412, 413, 422.8, 423.1, 428/480

See application file for complete search history.

(56) References Cited

U.S. PATENT DOCUMENTS

| | | | |
|---|---|---|---|
| 2,993,025 | A | 7/1961 | Alsup et al. |
| 3,161,616 | A | 12/1964 | Brown et al. |
| 3,161,617 | A | 12/1964 | Kritzler et al. |
| 3,269,988 | A | 8/1966 | Braude et al. |
| 3,340,234 | A | 9/1967 | Brown et al. |
| 3,346,663 | A | 10/1967 | Kern et al. |
| 3,380,966 | A | 4/1968 | Fouts |
| 3,393,179 | A | 7/1968 | Leverett et al. |
| 3,642,940 | A | 2/1972 | Burg et al. |
| 3,865,284 | A | 2/1975 | Kazama et al. |
| 3,998,791 | A | 12/1976 | Radici et al. |
| 4,097,453 | A | 6/1978 | Radici et al. |
| 4,111,912 | A | 9/1978 | Sextro et al. |
| 4,169,867 | A | 10/1979 | Burg et al. |
| 4,195,158 | A | 3/1980 | Burg et al. |
| 4,431,794 | A | 2/1984 | Sadlowski et al. |
| 4,493,751 | A | 1/1985 | Cherdron et al. |
| 4,517,319 | A | 5/1985 | Reske et al. |
| 4,640,949 | A | 2/1987 | Wagman |
| 4,683,267 | A | 7/1987 | Lindner et al. |
| 4,689,373 | A | 8/1987 | Auerbach et al. |
| 4,780,498 | A | 10/1988 | Goerrissen et al. |
| 4,795,477 | A | 1/1989 | Kusumgar et al. |
| 4,804,716 | A | 2/1989 | Flexman, Jr. |
| 4,828,755 | A | 5/1989 | Kusumgar et al. |
| 4,845,161 | A | 7/1989 | Richardson |
| 4,929,712 | A | 5/1990 | Sugiyama et al. |
| 4,950,773 | A | 8/1990 | Monnier et al. |

(Continued)

FOREIGN PATENT DOCUMENTS

| | | |
|---|---|---|
| AU | 2148770 | 4/1972 |
| DE | 1 158 709 | 12/1963 |

(Continued)

OTHER PUBLICATIONS

Co-pending U.S. Appl. No. 13/879,360, Larson, et al., filed Apr. 12, 2013.

Co-pending U.S. Appl. No. 12/423,671, Klaus Kurz, et al., filed Apr. 14, 2009.

Co-pending U.S. Appl. No. 12/904,575, Lowell Larson, filed Oct. 14, 2010.

Co-pending U.S. Appl. No. 13/631,072, Lowell Larson, filed Sep. 28, 2012.

(Continued)

*Primary Examiner* — Betelhem Shewareged

(74) *Attorney, Agent, or Firm* — Dority & Manning, P.A.

(57) ABSTRACT

Polymer compositions containing a polyoxymethylene polymer are disclosed that are receptive to paints and ink coatings. The polymer composition contains a polyoxymethylene polymer having a relatively high terminal hydroxyl group content in combination with a thermoplastic elastomer. In one embodiment, a coupling agent may be added for coupling the thermoplastic elastomer to the polyoxymethylene polymer. The polymer composition can be molded into various articles and then painted or printed with an ink composition. The polymer composition has been found to dramatically improve adhesion between the molded article and the ink or paint coating.

21 Claims, No Drawings

(56) References Cited

U.S. PATENT DOCUMENTS 4,968,756 A 11/1990 Silvis et al.
4,975,518 A 12/1990 Broussard et al.
4,975,519 A 12/1990 Yang et al.
4,978,725 A 12/1990 Reske et al.
4,996,253 A 2/1991 Mulholland
5,004,784 A 4/1991 Huynh-Ba
5,004,798 A 4/1991 Broussard et al.
5,039,741 A 8/1991 Burg
5,043,398 A 8/1991 Auerbach et al.
5,143,982 A 9/1992 Niino
5,144,005 A 9/1992 Sextro et al.
5,173,532 A 12/1992 Endo et al.
5,183,860 A 2/1993 Kashihara
5,206,308 A 4/1993 Auerbach et al.
5,286,807 A 2/1994 Flexman, Jr.
5,288,840 A 2/1994 Morishita et al.
5,292,824 A 3/1994 Nagai et al.
5,310,822 A 5/1994 Kielhorn-Bayer et al.
5,326,846 A 7/1994 Nagai et al.
5,380,724 A 1/1995 Zubovics et al.
5,530,061 A 6/1996 Sanada et al.
5,541,284 A 7/1996 Arnoldi et al.
5,587,449 A 12/1996 Fleischer et al.
5,599,860 A 2/1997 Memon et al.
5,608,030 A 3/1997 Hoffmockel et al.
5,834,542 A 11/1998 Kielhorn-Bayer et al.
5,837,744 A 11/1998 Nagashima et al.
5,852,135 A 12/1998 Kanai et al.
5,859,131 A 1/1999 Ishiura et al.
5,866,670 A 2/1999 Nakai et al.
5,910,540 A 6/1999 Takahashi
5,919,849 A 7/1999 Memon et al.
5,942,593 A 8/1999 Pudleiner et al.
5,959,036 A 9/1999 Yahiro et al.
5,962,623 A 10/1999 Eckardt et al.
6,187,859 B1 2/2001 Humphrey et al.
6,271,302 B1 8/2001 Matsushima
6,312,828 B1 * 11/2001 Akao ............................ 428/516
6,388,049 B1 5/2002 Yokoyama et al.
6,433,106 B1 8/2002 Mori et al.
6,441,056 B2 8/2002 Keller
6,489,388 B1 12/2002 Kurz et al.
6,506,850 B1 1/2003 Tanimura et al.
6,512,047 B2 1/2003 Kim et al.
6,559,266 B2 5/2003 Kaufhold et al.
6,706,807 B2 3/2004 Kaufhold et al.
6,821,630 B2 11/2004 Takada et al.
6,872,775 B2 3/2005 Greulich et al.
6,936,651 B2 8/2005 Flexman
6,969,651 B1 11/2005 Lu et al.
7,008,986 B2 3/2006 Dames et al.
7,041,718 B2 5/2006 Harashina et al.
7,138,175 B2 11/2006 Saito
7,169,887 B2 1/2007 Papke
7,223,809 B2 5/2007 Notorgiacomo
7,329,695 B2 2/2008 Tucker et al.
7,618,714 B2 11/2009 Ziegler et al.
7,644,657 B1 1/2010 Clark et al.
7,645,822 B2 1/2010 Assmann et al.
7,745,548 B2 6/2010 Zierer et al.
7,812,110 B2 10/2010 Haubs et al.
7,829,610 B2 11/2010 Papke
7,858,202 B2 12/2010 Prigandt et al.
7,863,393 B2 1/2011 Assmann et al.
7,906,594 B2 3/2011 Muck et al.
7,915,350 B2 3/2011 Schmalz et al.
7,943,726 B2 5/2011 Haubs et al.
8,008,390 B2 8/2011 Gunnewig et al.
8,128,845 B2 3/2012 Moraczewski et al.
8,236,430 B2 8/2012 Ziegler et al.
2003/0148117 A1 8/2003 Takada et al.
2004/0118509 A1 6/2004 Flexman et al.
2004/0121175 A1 6/2004 Flexman et al.
2004/0157959 A1 * 8/2004 Turgis et al. .................. 523/160
2004/0228971 A1 11/2004 Scaramuzzino
2005/0043492 A1 2/2005 Chin et al.
2005/0107513 A1 5/2005 Papke
2005/0131124 A1 6/2005 Philippoz et al.
2005/0156351 A1 7/2005 Straus et al.
2005/0173433 A1 8/2005 Spahr
2006/0111507 A1 5/2006 Papke
2006/0151505 A1 7/2006 Kobayashi
2006/0175325 A1 8/2006 Day
2006/0252912 A1 11/2006 Hoffmockel et al.
2007/0010633 A1 1/2007 Park et al.
2007/0049685 A1 3/2007 Hansel et al.
2007/0154727 A1 7/2007 Ziegler et al.
2007/0202332 A1 8/2007 Gunnewig et al.
2007/0264514 A1 11/2007 Prigandt et al.
2008/0029934 A1 2/2008 Ziegler et al.
2008/0214748 A1 9/2008 Assmann et al.
2009/0151707 A1 6/2009 Davis et al.
2009/0189314 A1 7/2009 Peerlings et al.
2009/0220719 A1 9/2009 Klug et al.
2009/0264583 A1 10/2009 Kurz et al.
2009/0283931 A1 11/2009 Pfeiffer et al.
2011/0086952 A1 4/2011 Bessho et al.
2011/0195148 A1 * 8/2011 Mentink et al. ................... 426/3
2012/0091013 A1 4/2012 Larson et al.
2012/0276314 A1 11/2012 Latz et al.
2013/0082064 A1 4/2013 Larson et al.

FOREIGN PATENT DOCUMENTS

DE 2 263 300 A1 7/1974
DE 44 36 107 A1 4/1996
DE 196 33 708 A1 2/1997
DE 10003370 A1 8/2001
DE 10 2005 016 130 A1 10/2006
EP 0 115 846 A2 2/1984
EP 0 108 324 A 5/1984
EP 0116456 8/1984
EP 0137305 A2 4/1985
EP 0 156 285 A2 10/1985
EP 0276080 7/1988
EP 0342344 4/1989
EP 0 397 492 A2 11/1990
EP 0 397 493 A2 11/1990
EP 0 397 494 A2 11/1990
EP 0 398 588 A2 11/1990
EP 0397793 A1 11/1990
EP 0 400 827 A2 12/1990
EP 0511412 4/1991
EP 0 504 405 A1 9/1992
EP 0565304 4/1993
EP 0354802 B1 7/1993
EP 0420564 B1 10/1994
EP 0654501 11/1994
EP 0 716 105 A2 6/1996
EP 0 999224 A 5/2000
EP 0992541 B1 9/2004
EP 1 869 121 B1 9/2009
GB 1017244 7/1962
GB 1009881 11/1965
GB 1009884 11/1965
GB 1331829 9/1973
GB 1335806 10/1973
GB 1377083 12/1974
GB 1444789 8/1976
GB 1 524 440 A 9/1978
GB 1524410 A 9/1978
GB 1590549 6/1981
JP S4741120 12/1972
JP 3 284675 12/1991
JP 4/114003 A 4/1992
JP 4/145114 5/1992
JP 5/59255 A 3/1993
JP 6 179673 6/1994
JP 7 010871 1/1995
JP 7 033766 2/1995
JP 2000-154181 6/2000
JP 2003-147161 5/2003
JP 2004204051 7/2004
JP 2012077258 A 4/2012

(56) References Cited

FOREIGN PATENT DOCUMENTS

| | | | |
|---|---|---|---|
| WF | WO 2004/065444 | | 5/2004 |
| WO | WO 03/050187 | | 6/2003 |
| WO | WO 2005/012380 | A1 | 2/2005 |
| WO | WO 2006-089915 | | 8/2006 |
| WO | WO 2006/097486 | | 9/2006 |
| WO | WO 2006/105918 | | 10/2006 |
| WO | WO 2007/073873 | A1 | 5/2007 |
| WO | WO 2007/073874 | A1 | 5/2007 |

OTHER PUBLICATIONS

Co-pending U.S. Appl. No. 14/135,699, Bruce Mulholland, filed Dec. 20, 2013.

Co-pending U.S. Appl. No. 13/433,517, Guido Latz, filed Mar. 29, 2012.

Braun et al., "Influences of structural parameters on the dynamic mechanical properties of polyacetals", *Die Arrgewandte Makromoiekuiam Chemie* 228 (1995), pp. 185-200 (Nr. 4030).

Chujo et al., "Reversible Gelation of Polyoxazoline by Means of Diels-Alder Reaction", Macromolecules (1990), 23, 2636-2641.

Ishida, "Polymerization of Formaldehyde and the Physical Properties of the Polymerization Products, I ", *Journal of Applied Polymer Science*, vol. 26, pp. 2743-2750 (1981).

Kawaguchi et al, "Tensile Behavior of Glass-Fiber-Filled Polyacetal: Influence of the Functional Groups of Polymer Matrices", Journal of Applied Polymer Science, vol. 107, pp. 667-673 (2008).

Kobayashi et al., "Molecular Weight Distribution of Polyoxymethylene Obtained in Solid-State Polymerization of Trioxane Catalyzed by $BF_3O(C_2H_5)_2$", J. Macromol. Sci.—Chem., A1(8), pp. 1519-1529, Dec. 1967 (abstract only).

Mehrabzadeh et al., "Impact Modification of Polyacetal by Thermoplastic Elastomer Polyurethane", Journal of Applied Polymer Science, vol. 84, 2573-2582 (2002).

Search Report and Written Opinion for Application No PCT/US2012/070789, dated Mar. 25, 2013.

* cited by examiner

PRINTABLE MOLDED ARTICLES MADE FROM A POLYOXYMETHYLENE POLYMER COMPOSITION

RELATED APPLICATIONS

The present application claims priority to U.S. Provisional Application No. 61/581,805 filed Dec. 30, 2011, which is hereby incorporated by reference in its entirety.

BACKGROUND

Polyacetal polymers, which are commonly referred to as polyoxymethylene polymers, have become established as exceptionally useful engineering materials in a variety of applications. Polyoxymethylene polymers, for instance, are widely used in constructing molded parts, such as parts for use in the automotive industry and the electrical industry. Polyoxymethylene polymers have excellent mechanical properties, fatigue resistance, abrasion resistance, chemical resistance, and moldability.

Although polyoxymethylene polymers have excellent physical characteristics, the polymers are typically not amenable to many printing or painting processes. For instance, due to a low surface energy and high crystallinity, polyoxymethylene polymers are not receptive to many paints and printing inks. Printing inks, for instance, do not sufficiently adhere to the surface of the polymer for many applications.

In view of the above, a need exists for a polyoxymethylene polymer composition and to a process for molding polyoxymethylene articles that have greater affinity and adhesion to paints and inks.

SUMMARY

In general, the present disclosure is directed to a polymer composition containing a polyoxymethylene polymer that is well suited to receiving and adhering to an ink composition. The polyoxymethylene polymer composition can be formed into an article through any suitable molding process, such as injection molding or blow molding. Once the article is produced, the article can then be subjected to a printing process, such as a pad printing process, in which an ink composition is applied to an exterior surface of the article. Of particular advantage, the ink composition can be directly applied to the surface of the article without having to apply a primer or otherwise pretreat the surface. As will be described in greater detail below, it was discovered that the polymer composition of the present disclosure exhibits excellent adhesion to ink compositions as demonstrated when subjected to adhesion tests, such as the cross hatch tape pull test according to ISO Test 2409 or ASTM Test D3359.

In one embodiment, for instance, the present disclosure is directed to a molded article made from a polymer composition. In accordance with the present disclosure, the polymer composition comprises a polyoxymethylene polymer blended with a thermoplastic elastomer. More particularly, a polyoxymethylene polymer is selected for use in the composition wherein at least about 50%, such as at least about 60%, such as at least about 70%, such as at least about 80% of the terminal groups on the polyoxymethylene polymer are functional groups, such as hydroxyl groups. The hydroxyl groups may comprise, for instance, hydroxyethylene groups and/or hydroxyl side groups.

The molded article further includes a coating applied to the exterior surface of the article. The coating comprises an ink composition and can be continuous or discontinuous over the surface of the molded article. In one embodiment, for instance, the coating has been pad printed onto the exterior surface of the molded article. The coating may comprise, for instance, printed matter, designs, or the like. The ink composition can comprise a polymer resin combined with at least one coloring agent. The resin may comprise a cross-linked polymer, such as a polyvinyl alcohol, an epoxy, an acrylic, an acrylate, an acrylated urethane, a polyester, or a polyether. The coloring agent, on the other hand, may comprise an organic or inorganic pigment, an organic or inorganic dye, or mixtures thereof.

The polymer composition as described above contains a polyoxymethylene polymer blended with a thermoplastic elastomer. In one embodiment, a coupling agent may also be contained in the polymer composition for coupling the thermoplastic elastomer to the polyoxymethylene polymer. The coupling agent, for instance, may comprise an isocyanate. The thermoplastic elastomer may comprise, in one embodiment, a thermoplastic polyurethane elastomer. The thermoplastic elastomer may be present in the polymer composition in an amount greater than 10% by weight, such as in an amount greater than 12% by weight, such as in an amount greater than 14% by weight, such as in an amount greater than 16% by weight.

Of particular advantage, the polymer composition of the present disclosure including a polyoxymethylene polymer blended with a thermoplastic elastomer is capable of receiving an ink composition without having to pretreat the surface of the molded article. Thus, in one embodiment, the ink composition is applied directly to an exterior surface of the molded article. Further, the ink composition can be applied to an exterior surface of the molded article without any pretreatment. In one embodiment, however, if desired, the surface of the molded article may be subjected to a corona discharge treatment prior to applying the ink composition.

The coating applied to the exterior surface of the molded article may be a single color or may comprise a plurality of colors. Molded articles made according to the present disclosure may be used in numerous different fields. For instance, the molded product may comprise a medical device, an automotive part, a consumer appliance part, a sporting good, or the like.

Other features and aspects of the present disclosure are discussed in greater detail below.

DETAILED DESCRIPTION

It is to be understood by one of ordinary skill in the art that the present discussion is a description of exemplary embodiments only, and is not intended as limiting the broader aspects of the present disclosure.

In general, the present disclosure is directed to a polyacetal composition that is well suited to being molded into a particular shape and then coated with an ink composition. The present disclosure is also directed to a process for producing molded parts containing a polyoxymethylene polymer and then applying a paint or ink composition to a surface of the molded part. More particularly, the present disclosure is directed to a polymer composition containing a polyoxymethylene polymer that is formulated so as to increase adhesion between various ink compositions and the surface of a molded article made from the polymer composition. In one embodiment, for instance, the ink composition can be applied to the molded article in a printing process.

In the past, various significant challenges have been faced by those skilled in the art attempting to decorate molded articles made from a polyoxymethylene polymer by printing or painting. Polyoxymethylene polymers, for instance, typically do not adhere well to printing inks. Thus, once printed with an ink, the design, color or decoration printed on the molded article had a tendency to wear off prematurely and not be scratch resistant. Consequently, the use of molded articles made from polyoxymethylene polymers has been limited, especially in applications where there is a desire to apply designs and/or printed matter to the article.

The present disclosure is directed to a polymer composition containing a polyoxymethylene polymer that has dramatically improved receptive and adhesion properties to decorative surface coatings, such as ink compositions. In general, the polymer composition comprises a combination of a polyoxymethylene polymer having a relatively high number of functional groups combined with a thermoplastic elastomer. The combination of a functional polyoxymethylene polymer with a thermoplastic elastomer has been found to unexpectedly improve adhesion to decorative coatings, thus not only improving wear but also improving scratch resistance. The above properties are particularly unexpected in that the increased functional groups on the polyoxymethylene polymer and/or the presence of the thermoplastic elastomer does not significantly change the surface energy in comparison to conventional polyoxymethylene polymers.

As described above, the polyoxymethylene polymer contained in the polymer composition has a relatively high number of functional groups. In one embodiment, for instance, the polyoxymethylene polymer includes a significant number of hydroxyl groups in the terminal position. For instance, in one embodiment, ether end groups on the polyoxymethylene polymer can be replaced with ethoxy hydroxy end groups. The hydroxyl group content of the polyoxymethylene polymer can be further increased by using a comonomer with hydroxyl side chains. The hydroxyl group concentration may also be increased through the use of a polyoxymethylene moiety with a dendrimer structure. The polyoxymethylene polymer can include more than 20 hydroxyl groups per chain, such as more than 25 hydroxyl groups per chain. In one embodiment, for instance, the polyoxymethylene polymer may include from about 20 hydroxyl groups per chain to about 50 hydroxyl groups per chain.

More particularly, the polyoxymethylene polymer can have terminal hydroxyl groups, for example, hydroxyethylene groups and/or hydroxyl side groups in at least more than about 50% of all the terminal sites on the polymer. For instance, the polyoxymethylene polymer may have at least about 70%, such as at least about 80%, such as at least about 85% of its terminal groups be hydroxyl groups, based on the total number of terminal groups present. It should be understood that the total number of terminal groups present includes all side terminal groups.

As described above, the polymer composition further contains a thermoplastic elastomer. The thermoplastic elastomer may comprise, for instance, a thermoplastic polyurethane elastomer and/or a polyester elastomer. The thermoplastic elastomer is present in the composition in an amount greater than about 5% by weight, such as in an amount greater than 10% by weight, such as in an amount greater than about 15% by weight. In one embodiment, a coupling agent may be present in the composition for coupling the thermoplastic elastomer to the polyoxymethylene polymer. For example, the thermoplastic elastomer may be chemically bonded to the polyoxymethylene polymer.

As described above, the polymer composition dramatically improves adhesion to decorative coatings. Of particular advantage, molded articles made from the polymer composition described above are well suited for use in pad printing processes. In a pad printing process, a discontinuous coating or a continuous coating can be applied to a three-dimensional object using a rubber pad that is typically made from a silicone. During pad printing, an image is transferred from a printing plate onto the rubber pad. The rubber pad then contacts the molded article for printing a design on the molded article. Pad printing is particularly well suited to transferring an ink composition to a non-flat surface. The ink composition may be transferred to the molded article in order to change the color of the article, print a design onto the article, and/or to transfer printed matter onto the article. For instance, the image can be transferred from the rubber pad to cylindrical surfaces, spherical surfaces, textured surfaces, concave surfaces, convex surfaces, and generally to any surface that has a three-dimensional configuration.

In addition to pad printing processes, molded articles made according to the present disclosure may also be printed using other techniques. For instance, the molded articles are also well suited for use in inkjet printing processes, flexographic printing processes, painting processes, and the like.

The ink composition applied to molded articles in accordance with the present disclosure can vary depending upon the particular application, the particular printing process and the desired result. In one embodiment, the ink composition may contain a coloring agent, a polymer resin, a solvent, and optionally an initiator and/or a crosslinking agent. Once the ink composition is applied to molded articles in accordance with the present disclosure, the ink composition can be dried or cured through the application of heat, ultraviolet light, electron beam radiation, or the like.

The coloring agent contained in the ink composition may comprise a dye, a pigment, or mixtures thereof. Dyes are coloring agents that are soluble in a solvent, are translucent, and typically absorb but do not scatter light. Pigments, on the other hand, typically refer to opaque coloring agents that are insoluble. Pigments can be made from organic compounds or from inorganic compounds.

Pigments that may be present in the ink composition can vary without limitation. Pigments that may be used, for instance, include carbon black, iron oxides, including iron oxide black, red lake pigment, quinacrydone pigments, and the like. Other pigments include phthalocyanine blue, cobalt blue, phthalocyanine green, chromium sesquioxide, carbazole violet, and the like. Titanium dioxide, calcium carbonate, magnesium oxide, talc and barium sulfate may also be used as a pigment and/or an opacifier. The ink composition can contain a single pigment or can contain a plurality of pigments. For instance, any suitable color can be created by mixing two or more pigment colors together to achieve a desired shade.

In general, an ink composition can contain one or more coloring agents in an amount from about 1% to about 60% by weight, such as in an amount from about 2% to about 20% by weight.

In addition to one or more coloring agents, the ink composition can contain a polymer resin. In one embodiment, the polymer resin comprises a resin that becomes crosslinked when the ink composition is dried or cured.

The polymer resin present in the ink composition may comprise an oligomer. Examples of polymer resins that may be used include epoxies, acrylics, acrylated urethanes, acrylates including methacrylates, polyesters, polyethers, polyvinyl alcohols, and the like. The ink composition may contain a single polymer resin or may contain a blend of resins. One or more polymer resins may be contained in the ink composition in an amount from about 10% to about 90% by weight, such as in an amount from about 20% to about 80% by weight.

As described above, the ink composition can contain a solvent which may comprise water. Other solvents may comprise organic or inorganic solvents. Exemplary solvents include, without limitation, acetone, alcohols (e.g., methanol, ethanol, propanol, isopropanol, etc.), glycols, ketones, esters, cyclopentanone, cyclohexanone, tetrahydrofuran, acetone, methyl-2-pyrrolidone, dimethyl formamide, acetophenone, methylene dichloride, dimethyl sulfoxide, gamma-butyrolactone, ethylene dichloride, isophorone, o-dichlorobenzene, tetrahydrofuran, diacetone alcohol, methyl ethyl ketone, acetone, 2-nitropropane, ethylene glycol monoethyl ether, propylene carbonate, cyclohexanol, chloroform, trichloroethylene, 1,4-dioxane, ethyl acetate, ethylene glycol monobutyl ether, chlorobenzene, nitroethane, ethylene glycol monomethyl ether, butyl acetate, 1-butanol, methyl isobutyl ketone, nitromethane, toluene, ethanol, diethylene glycol, benzene, diethyl ether, ethanolamine, carbon tetrachloride, propylene glycol, hexane, ethylene glycol, and formamide.

The solvent may also be a mixture of several organic solvents or a mixture of water and one or more water soluble or water miscible organic components, such as ethylene glycol, propylene glycol, diethylene glycol, glycerine, dipropylene glycol, polyethylene glycol, polypropylene glycol, amides, ethers, urea, substituted ureas, carboxylic acids and their salts, esters, alcohols, organosulfides, organosulfoxides, sulfones (such as sulfolane), alcohol derivatives, carbitol, butyl carbitol, cellosolve, tripropylene glycol monomethyl ether, ether derivatives, amino alcohols, ketones, N-methylpyrrolidinone, 2-pyrrolidinone, cyclohexylpyrrolidone, hydroxyethers, sulfoxides, lactones, polyelectrolytes, methyl sulfonylethanol, imidazole, betaine, and other water soluble or water miscible materials, as well as mixtures thereof.

The ink composition may also contain an initiator and/or a crosslinking agent. An initiator may be present, for instance, if the ink composition is ultraviolet light curable. Initiators that may be used include peroxides or nitriles. In one embodiment, a wetting agent including surfactants may also be contained in the ink composition.

Various commercially available ink compositions may be used for applying to molded articles made in accordance with the present disclosure. For instance, in one embodiment, the ink composition may be obtained commercially from ITW TransTech of Carol Stream, Ill. Ink compositions particularly well suited for use in application to molded articles in accordance with the present disclosure include printing ink type B, printing ink type B/GL, printing ink type PV, printing ink type R or printing ink type W, which are all available from the above supplier.

As described above, in one embodiment, a pad printing process may be used for applying the ink composition to the molded article. During pad printing, a deformable pad is used to apply the ink composition to an exterior surface of the molded article. In one embodiment, the ink composition is applied to a printing plate for transfer to a print pad. In an alternative embodiment, an inkjet head may be used to deposit the ink composition onto a deformable pad. The pad is then forcibly deformed while being brought into contact with the molded article. The image then transfers to the molded article and the ink composition is dried and/or cured.

As described above, the polymer composition of the present disclosure generally contains a polyoxymethylene polymer having a relatively high amount of reactive groups combined with a thermoplastic elastomer. The polyoxymethylene polymer may comprise a homopolymer or copolymer.

The preparation of the polyoxymethylene can be carried out by polymerization of polyoxymethylene-forming monomers, such as trioxane or a mixture of trioxane and dioxolane, in the presence of ethylene glycol as a molecular weight regulator. The polymerization can be effected as precipitation polymerization or in the melt. By a suitable choice of the polymerization parameters, such as duration of polymerization or amount of molecular weight regulator, the molecular weight and hence the MVR value of the resulting polymer can be adjusted. The above-described procedure for the polymerization can lead to polymers having comparatively small proportions of low molecular weight constituents. If a further reduction in the content of low molecular weight constituents were to be desired, this can be effected by separating off the low molecular weight fractions of the polymer after the deactivation and the degradation of the unstable fractions after treatment with a basic protic solvent. This may be a fractional precipitation from a solution of the stabilized polymer; polymer fractions of different molecular weight distribution being obtained.

In one embodiment, a polyoxymethylene polymer with hydroxyl terminal groups can be produced using a cationic polymerization process followed by solution hydrolysis to remove any unstable end groups. During cationic polymerization, a glycol, such as ethylene glycol can be used as a chain terminating agent. The cationic polymerization results in a bimodal molecular weight distribution containing low molecular weight constituents. In one particular embodiment, the low molecular weight constituents can be significantly reduced by conducting the polymerization using a heteropoly acid such as phosphotungstic acid as the catalyst. When using a heteropoly acid as the catalyst, for instance, the amount of low molecular weight constituents can be less than about 2% by weight.

A heteropoly acid refers to polyacids formed by the condensation of different kinds of oxo acids through dehydration and contains a mono- or poly-nuclear complex ion wherein a hetero element is present in the center and the oxo acid residues are condensed through oxygen atoms. Such a heteropoly acid is represented by the formula:

$$H_x[M_m M'_n O_z]yH_2O$$

wherein

M represents an element selected from the group consisting of P, Si, Ge, Sn, As, Sb, U, Mn, Re, Cu, Ni, Ti, Co, Fe, Cr, Th or Ce, M' represents an element selected from the group consisting of W, Mo, V or Nb, m is 1 to 10, n is 6 to 40, z is 10 to 100, x is an integer of 1 or above, and y is 0 to 50.

The central element (M) in the formula described above may be composed of one or more kinds of elements selected from P and Si and the coordinate element (M') is composed of at least one element selected from W, Mo and V, particularly W or Mo.

Specific examples of heteropoly acids are phosphomolybdic acid, phosphotungstic acid, phosphomolybdotungstic acid, phosphomolybdovanadic acid, phosphomolybdotungstovanadic acid, phosphotungstovanadic acid, silicotungstic acid, silicomolybdic acid, silicomolybdotungstic acid, silicomolybdotungstovanadic acid and acid salts thereof.

Excellent results have been achieved with heteropoly acids selected from 12-molybdophosphoric acid ($H_3PMo_{12}O_{40}$) and 12-tungstophosphoric acid ($H_3PW_{12}O_{40}$) and mixtures thereof.

The heteropoly acid may be dissolved in an alkyl ester of a polybasic carboxylic acid. It has been found that alkyl esters of polybasic carboxylic acid are effective to dissolve the heteropoly acids or salts thereof at room temperature (25° C.).

The alkyl ester of the polybasic carboxylic acid can easily be separated from the production stream since no azeotropic mixtures are formed. Additionally, the alkyl ester of the polybasic carboxylic acid used to dissolve the heteropoly acid or an acid salt thereof fulfils the safety aspects and environmental aspects and, moreover, is inert under the conditions for the manufacturing of oxymethylene polymers.

Preferably the alkyl ester of a polybasic carboxylic acid is an alkyl ester of an aliphatic dicarboxylic acid of the formula:

$$(ROOC)—(CH_2)_n-(COOR')$$

wherein n is an integer from 2 to 12, preferably 3 to 6 and

R and R' represent independently from each other an alkyl group having 1 to 4 carbon atoms, preferably selected from the group consisting of methyl, ethyl, n-propyl, iso-propyl, n-butyl, iso-butyl and tert.-butyl.

In one embodiment, the polybasic carboxylic acid comprises the dimethyl or diethyl ester of the above-mentioned formula, such as a dimethyl adipate (DMA).

The alkyl ester of the polybasic carboxylic acid may also be represented by the following formula:

$$(ROOC)_2—CH—(CH_2)_m—CH—(COOR')_2$$

wherein m is an integer from 0 to 10, preferably from 2 to 4 and

R and R' are independently from each other alkyl groups having 1 to 4 carbon atoms, preferably selected from the group consisting of methyl, ethyl, n-propyl, iso-propyl, n-butyl, iso-butyl and tert.-butyl.

Particularly preferred components which can be used to dissolve the heteropoly acid according to the above formula are butantetracarboxylic acid tetratethyl ester or butantetracarboxylic acid tetramethyl ester.

Specific examples of the alkyl ester of a polybasic carboxylic acid are dimethyl glutaric acid, dimethyl adipic acid, dimethyl pimelic acid, dimethyl suberic acid, diethyl glutaric acid, diethyl adipic acid, diethyl pimelic acid, diethyl suberic acid, diemethyl phthalic acid, dimethyl isophthalic acid, dimethyl terephthalic acid, diethyl phthalic acid, diethyl isophthalic acid, diethyl terephthalic acid, butantetracarboxylic acid tetramethylester and butantetracarboxylic acid tetraethylester as well as mixtures thereof. Other examples include dimethylisophthalate, diethylisophthalate, dimethylterephthalate or diethylterephthalate.

Preferably, the heteropoly acid is dissolved in the alkyl ester of the polybasic carboxylic acid in an amount lower than 5 weight percent, preferably in an amount ranging from 0.01 to 5 weight percent, wherein the weight is based on the entire solution.

In some embodiments, the polymer composition of the present disclosure may contain other polyoxymethylene homopolymers and/or polyoxymethylene copolymers. Such polymers, for instance, are generally unbranched linear polymers which contain as a rule at least 80%, such as at least 90%, oxymethylene units. Such conventional polyoxymethylenes may be present in the composition as long as the resulting mixture maintains the above amounts of hydroxyl terminated groups and the above amounts of low molecular weight constituents.

In one embodiment, the polyoxymethylene polymer has a content of terminal hydroxyl groups of at least 5 mmol/kg, such as at least 10 mmol/kg, such as at least 15 mmol/kg. In one embodiment, the terminal hydroxyl group content ranges from 18 to 50 mmol/kg.

In addition to the terminal hydroxyl groups, the polyoxymethylene polymer may also have other terminal groups usual for these polymers. Examples of these are alkoxy groups, formate groups, acetate groups or aldehyde groups. According to one embodiment, the polyoxymethylene is a homo- or copolymer which comprises at least 50 mol-%, such as at least 75 mol-%, such as at least 90 mol-% and such as even at least 95 mol-% of $—CH_2O$-repeat units.

In addition to having a relatively high terminal hydroxyl group content, the polyoxymethylene polymer according to the present disclosure may have a relatively low amount of low molecular weight constituents. As used herein, low molecular weight constituents (or fractions) refer to constituents having molecular weights below 10,000 dalton. For example, the polyoxymethylene polymer can contain low molecular weight constituents in an amount less than about 10% by weight, based on the total weight of the polyoxymethylene. In certain embodiments, for instance, the polyoxymethylene polymer may contain low molecular weight constituents in an amount less than about 5% by weight, such as in an amount less than about 3% by weight, such as even in an amount less than about 2% by weight.

The polyoxymethylene polymer present in the composition can generally have a melt volume rate (MVR) of less than 50 $cm^3$/10 min, such as from about 1 to about 40 $cm^3$/10 min, determined according to ISO 1133 at 190° C. and 2.16 kg.

The amount of polyoxymethylene polymer present in the polymer composition of the present disclosure can vary depending upon the particular application. In one embodiment, for instance, the composition contains polyoxymethylene polymer in an amount of at least 50% by weight, such as in an amount greater than about 60% by weight, such as in an amount greater than about 65% by weight, such as in an amount greater than about 70% by weight. In general, the polyoxymethylene polymer is present in an amount less than about 95% by weight, such as in an amount less than about 90% by weight, such as in an amount less than about 85% by weight.

In general, any suitable thermoplastic elastomer may be combined with the polyoxymethylene polymer according to the present disclosure.

Thermoplastic elastomers are materials with both thermoplastic and elastomeric properties. Thermoplastic elastomers include styrenic block copolymers, polyolefin blends referred to as thermoplastic olefin elastomers, elastomeric alloys, thermoplastic polyurethanes, thermoplastic copolyesters, and thermoplastic polyamides.

Thermoplastic elastomers well suited for use in the present disclosure are polyester elastomers (TPE-E), thermoplastic polyamide elastomers (TPE-A) and in particular thermoplastic polyurethane elastomers (TPE-U). The above thermoplastic elastomers have active hydrogen atoms which can be reacted with coupling reagents and/or the polyoxymethylene polymer. Examples of such groups are urethane groups, amido groups, amino groups or hydroxyl groups. For instance, terminal polyester diol flexible segments of thermoplastic polyurethane elastomers have hydrogen atoms which can react, for example, with isocyanate groups.

In one particular embodiment, a thermoplastic polyurethane elastomer is used. The thermoplastic polyurethane elastomer, for instance, may have a soft segment of a long-chain diol and a hard segment derived from a diisocyanate and a chain extender. In one embodiment, the polyurethane elastomer is a polyester type prepared by reacting a long-chain diol with a diisocyanate to produce a polyurethane prepolymer having isocyanate end groups, followed by chain extension of the prepolymer with a diol chain extender. Representative long-chain diols are polyester diols such as poly (butylene adipate)diol, poly(ethylene adipate)diol and poly (ϵ-caprolactone)diol; and polyether diols such as poly (tetramethylene ether)glycol, polypropylene oxide)glycol and poly(ethylene oxide)glycol. Suitable diisocyanates include 4,4'-methylenebis(phenyl isocyanate), 2,4-toluene diisocyanate, 1,6-hexamethylene diisocyanate and 4,4'-methylenebis-(cycloxylisocyanate). Suitable chain extenders are $C_2$-$C_6$ aliphatic diols such as ethylene glycol, 1,4-butanediol, 1,6-hexanediol and neopentyl glycol. One example of a thermoplastic polyurethane is characterized as essentially poly (adipic acid-co-butylene glycol-co-diphenylmethane diisocyanate).

In one particular embodiment, a thermoplastic polyurethane elastomer is used that contains carbonate groups. The thermoplastic polyurethane elastomer, for instance, may have at least one soft segment containing carbonate groups.

Thermoplastic elastomers containing carbonate groups can be produced, in one embodiment, using a diol component that contains carbonate groups. For instance, the thermoplastic elastomer can be produced as described above by reacting together a polymer diol containing carbonate groups with an isocyanate and a chain extender. The polymer diol, for instance, may comprise a polycarbonate diol and/or a polyester polycarbonate diol.

A polycarbonate did may be produced by reacting a diol with a carbonate compound. The carbonate compound may comprise, for instance, a carbonate compound with alkyl groups, a carbonate compound with alkylene groups, or a carbonate compound containing aryl groups. Particular carbonate compounds include dimethyl carbonate, diethyl carbonate, ethylene carbonate, and/or diphenyl carbonate. A polyester polycarbonate, on the other hand, may be formed by reacting a diol with a carbonate compound as described above in the presence of a carboxylic acid.

As described above, the polycarbonate groups contained in the thermoplastic elastomer are generally referred to as soft segments. Thus, the polycarbonate groups have a tendency to lower the hardness of the thermoplastic elastomer. In one embodiment, for instance, the shore A hardness of the thermoplastic elastomer is less than about 98, such as less than about 95, such as less than about 93 when tested according to ISO Test 868. The shore A hardness of the material is generally greater than about 80, such as greater than about 85.

The amount of thermoplastic elastomer contained in the polymer composition can vary depending upon various factors. In general, the thermoplastic elastomer is present in an amount greater than about 5% by weight, such as in an amount greater than about 10% by weight, such as in an amount greater than about 15% by weight, such as in an amount greater than about 20% by weight, such as in an amount greater than about 25% by weight, such as in an amount greater than about 30% by weight. In general, the thermoplastic elastomer is present in amounts less than about 50% by weight, such as less than about 40% by weight, such as less than about 30% by weight.

In one embodiment, a coupling agent may be present in the polymer composition that couples the thermoplastic elastomer to the polyoxymethylene polymer.

In order to form bridging groups between the polyoxymethylene polymer and the thermoplastic elastomer, a wide range of polyfunctional, such as trifunctional or bifunctional coupling agents, may be used. The coupling agent may be capable of forming covalent bonds with the terminal hydroxyl groups on the polyoxymethylene polymer and with active hydrogen atoms on the thermoplastic elastomer. In this manner, the thermoplastic elastomer becomes coupled to the polyoxymethylene through covalent bonds.

In one embodiment, the coupling agent comprises a diisocyanate, such as an aliphatic, cycloaliphatic and/or aromatic diisocyanate. The coupling agent may be in the form of an oligomer, such as a trimer or a dimer.

In one embodiment, the coupling agent comprises a diisocyanate or a triisocyanate which is selected from 2,2'-, 2,4'-, and 4,4'-diphenylmethane diisocyanate (MDI); 3,3'-dimethyl-4,4'-biphenylene diisocyanate (TODD; toluene diisocyanate (TDI); polymeric MDI; carbodiimide-modified liquid 4,4'-diphenylmethane diisocyanate; para-phenylene diisocyanate (PPDI); meta-phenylene diisocyanate (MPDI); triphenyl methane-4,4'- and triphenyl methane-4,4"-triisocyanate; naphthylene-1,5-diisocyanate; 2,4'-, 4,4'-, and 2,2-biphenyl diisocyanate; polyphenylene polymethylene polyisocyanate (PMDI) (also known as polymeric PMDI); mixtures of MDI and PMDI; mixtures of PMDI and TDI; ethylene diisocyanate; propylene-1,2-diisocyanate; trimethylene diisocyanate; butylenes diisocyanate; bitolylene diisocyanate; tolidine diisocyanate; tetramethylene-1,2-diisocyanate; tetramethylene-1,3-diisocyanate; tetramethylene-1,4-diisocyanate; pentamethylene diisocyanate; 1,6-hexamethylene diisocyanate (HDI); octamethylene diisocyanate; decamethylene diisocyanate; 2,2,4-trimethylhexamethylene diisocyanate; 2,4,4-trimethylhexamethylene diisocyanate; dodecane-1,12-diisocyanate; dicyclohexylmethane diisocyanate; cyclobutane-1,3-diisocyanate; cyclohexane-1,2-diisocyanate; cyclohexane-1,3-diisocyanate; cyclohexane-1,4-diisocyanate; diethylidene diisocyanate; methylcyclohexylene diisocyanate (HTDI); 2,4-methylcyclohexane diisocyanate; 2,6-methylcyclohexane diisocyanate; 4,4'-dicyclohexyl diisocyanate; 2,4'-dicyclohexyl diisocyanate; 1,3,5-cyclohexane triisocyanate; isocyanatomethylcyclohexane isocyanate; 1-isocyanato-3,3,5-trimethyl-5-isocyanatomethylcyclohexane; isocyanatoethylcyclohexane isocyanate; bis (isocyanatomethyl)-cyclohexane diisocyanate; 4,4'-bis (isocyanatomethyl)dicyclohexane; 2,4'-bis (isocyanatomethyl)dicyclohexane; isophorone diisocyanate (IPDI); dimeryl diisocyanate, dodecane-1,12-diisocyanate, 1,10-decamethylene diisocyanate, cyclohexylene-1,2-diisocyanate, 1,10-decamethylene diisocyanate, 1-chlorobenzene-2,4-diisocyanate, furfurylidene diisocyanate, 2,4,4-trimethyl hexamethylene diisocyanate, 2,2,4-trimethyl hexamethylene diisocyanate, dodecamethylene diisocyanate, 1,3-cyclopentane diisocyanate, 1,3-cyclohexane diisocyanate, 1,3-cyclobutane diisocyanate, 1,4-cyclohexane diisocyanate, 4,4'-methylenebis(cyclohexyl isocyanate), 4,4'-methylenebis(phenyl isocyanate), 1-methyl-2,4-cyclohexane diisocyanate, 1-methyl-2,6-cyclohexane diisocyanate, 1,3-bis(isocyanato-methyl)cyclohexane, 1,6-diisocyanato-2,2,4,4-tetra-methylhexane, 1,6-diisocyanato-2,4,4-tetra-trimethylhexane, trans-cyclohexane-1,4-diisocyanate, 3-isocyanato-methyl-3,5,5-trimethylcyclo-hexyl isocyanate, 1-isocyanato-3,3,5-trimethyl-5-isocyanatomethylcyclohexane, cyclohexyl isocyanate, dicyclohexylmethane 4,4'-diisocyanate, 1,4-bis(isocyanatomethyl)cyclohexane, m-phenylene diisocyanate, m-xylylene diisocyanate, m-tetramethylxylylene diisocyanate, p-phenylene diisocyanate, p,p'-biphenyl diisocyanate, 3,3'-dimethyl-4,4'-biphenylene diisocyanate, 3,3'-dimethoxy-4,4'-biphenylene diisocyanate, 3,3'-diphenyl-4,4'-biphenylene diisocyanate, 4,4'-biphenylene diisocyanate, 3,3'-dichloro-4,4'-biphenylene diisocyanate, 1,5-naphthalene diisocyanate, 4-chloro-1,3-phenylene diisocyanate, 1,5-tetrahydronaphthalene diisocyanate, metaxylene diisocyanate, 2,4-toluene diisocyanate, 2,4'-diphenylmethane diisocyanate, 2,4-chlorophenylene diisocyanate, 4,4'-diphenylmethane diisocyanate, p,p'-diphenylmethane diisocyanate, 2,4-tolylene diisocyanate, 2,6-tolylene diisocyanate, 2,2-diphenylpropane-4,4'-diisocyanate, 4,4'-toluidine diisocyanate, dianidine diisocyanate, 4,4'-diphenyl ether diisocyanate, 1,3-xylylene diisocyanate, 1,4-naphthylene diisocyanate, azobenzene-4,4'-diisocyanate, diphenyl sulfone-4,4'-diisocyanate, or mixtures thereof.

In one embodiment, an aromatic polyisocyanate is used, such as 4,4'-diphenylmethane diisocyanate (MDI).

The polymer composition generally contains the coupling agent in an amount from about 0.1% to about 10% by weight. In one embodiment, for instance, the coupling agent is present in an amount greater than about 1% by weight, such as in an amount greater than 2% by weight. In one particular embodiment, the coupling agent is present in an amount from about 0.2% to about 5% by weight. To ensure that the thermoplastic elastomer has been completely coupled to the polyoxymethylene polymer, in one embodiment, the coupling agent can be added to the polymer composition in molar excess amounts when comparing the reactive groups on the coupling agent with the amount of terminal hydroxyl groups on the polyoxymethylene polymer.

The polymer composition of the present disclosure can optionally contain a stabilizer and/or various other known additives. Such additives can include, for example, antioxidants, acid scavengers, UV stabilizers or heat stabilizers. In addition, the molding material or the molding may contain processing auxiliaries, for example adhesion promoters, lubricants, nucleating agents, demolding agents, fillers, reinforcing materials or antistatic agents and additives which impart a desired property to the molding material or to the molding.

For instance, in one embodiment, an ultraviolet light stabilizer may be present. The ultraviolet light stabilizer may comprise a benzophenone, a benzotriazole, or a benzoate. Particular examples of ultraviolet light stabilizers include 2,4-dihydroxy benzophenone, 2-hydroxy-4-methoxybenzophenone, 2-(2'-hydroxy-3',5'-di-t-butylphenyl)benzotriazole, 2-(2'-hydroxy-3'-t-butyl-5'-methylphenyl)-5-chlorobenzotriazole, 2,4-dihydroxybenzophenone, 2-hydroxy-4-methoxybenzophenone, 2-hydroxy-4-octoxybenzophenone, and 5,5'-methylene bis(2-hydroxy-4-methoxybenzophenone); 2-(2'-hydroxyphenyl)benzotriazoles, e.g. 2-(2'-hydroxy-5'-methylphenyl)benzotriazole, 2-(2'-hydroxy-5'-t-octylphenyl)benzotriazole, 2-(2'-hydroxy-3',5'-di-t-butylphenyl)benzotriazole, 2-(2'-hydroxy-3',5'-di-t-butylphenyl)-5-chlorobenzotriazole, 2-(2'-hydroxy-3'-t-butyl-5'-methylphenyl)-5-chlorobenzotriazole, 2-(2'-hydroxy-3',5'-dicumylphenyl)benzotriazole, and 2,2'-methylene bis(4-t-octyl-6-benzotriazoly)phenol, phenylsalicylate, resorcinol monobenzoate, 2,4-di-t-butylphenyl-3',5'-di-t-butyl-4'-hydroxybenzoate, and hexadecyl-3,5-di-t-butyl-4-hydroxybenzoate; substituted oxanilides, e.g. 2-ethyl-2'-ethoxyoxanilide and 2-ethoxy-4'-dodecyloxanilide; cyanoacrylates, e.g. ethyl-α-cyano-β,β-diphenylacrylate and methyl-2-cyano-3-methyl-3-(p-methoxyphenyl)acrylate, or mixtures thereof.

In one embodiment, the polymer composition may also include a formaldehyde scavenger, such as a nitrogen-containing compound. The nitrogen scavenger, for instance, may comprise a guanamine compound, such as benzoguanamine.

In one embodiment, the composition may contain a nucleant. The nucleant, for instance, may increase crystallinity and may comprise an oxymethylene terpolymer. In one particular embodiment, for instance, the nucelant may comprise a terpolymer of butanediol diglycidyl ether, ethylene oxide, and trioxane. The nucleant can be present in the composition in an amount greater than about 0.05% by weight, such as greater than about 0.1% by weight. The nucleant may also be present in the composition in an amount less than about 2% by weight, such as in an amount less than about 1% by weight.

Still another additive that may be present in the composition is a sterically hindered phenol compound, which may serve as an antioxidant. Examples of such compounds, which are available commercially, are pentaerythrityl tetrakis[3-(3,5-di-tert-butyl-4-hydroxyphenyl)propionate] (Irganox 1010, BASF), triethylene glycol bis[3-(3-tert-butyl-4-hydroxy-5-methylphenyl)propionate] (Irganox 245, BASF), 3,3'-bis[3-(3,5-di-tert-butyl-4-hydroxyphenyl)propionohydrazide] (Irganox MD 1024, BASF), hexamethylene glycol bis[3-(3,5-di-tert-butyl-4-hydroxyphenyl)propionate] (Irganox 259, BASF), and 3,5-di-tert-butyl-4-hydroxytoluene (Lowinox BHT, Chemtura). Preference is given to Irganox 1010 and especially Irganox 245. The above compounds may be present in the composition in an amount less than about 2% by weight, such as in an amount from about 0.01% to about 1% by weight.

Light stabilizers that may be present in addition to the ultraviolet light stabilizer in the composition include sterically hindered amines. Hindered amine light stabilizers that may be used include oligomeric compounds that are N-methylated. For instance, another example of a hindered amine light stabilizer comprises ADK STAB LA-63 light stabilizer available from Adeka Palmarole. The light stabilizers, when present, can be included in amounts greater than about 0.1% by weight, such as in amounts greater than about 0.5% by weight, but in an amount less than about 2% by weight, such as in an amount less than about 1% by weight.

Fillers that may be included in the composition include glass beads, wollastonite, loam, molybdenum disulfide or graphite, inorganic or organic fibers such as glass fibers, carbon fibers or aramid fibers. The glass fibers, for instance, may have a length of greater than about 3 mm, such as from 5 to about 50 mm. The composition can further include thermoplastic or thermoset polymeric additives, or elastomers such as polyethylene, polyurethane, polymethyl methacrylate, polybutadiene, polystyrene, or else graft copolymers whose core has been prepared by polymerizing 1,3-butadiene, isoprene, n-butyl acrylate, ethylhexyl acrylate, or mixtures of these, and whose shell has been prepared by polymerizing styrene, acrylonitrile or (meth)acrylates.

In one embodiment, the composition may also contain one or more lubricants. The lubricant may comprise a polymer wax composition. Lubricants that may be included in the composition include, for instance, N,N'-ethylene bisstearamide. In one embodiment, a polyethylene glycol polymer (processing aid) may be present in the composition. The polyethylene glycol, for instance, may have a molecular weight of from about 1000 to about 5000, such as from about 3000 to about 4000. In one embodiment, for instance, PEG-75 may be present. Lubricants can generally be present in the polymer composition in an amount from about 0.01% to about 5% by weight. For instance, a lubricant can be present in an amount greater than about 0.1% by weight, such as in an amount from about 0.1% to about 1% by weight. The above polyethylene glycol polymer can also be present in an amount up to about 5% by weight. For instance, the polyethylene glycol polymer can be present in an amount from about 0.1% to about 2% by weight, such as from about 0.5% to about 1% by weight.

In addition to the above components, the polymer composition may also contain an acid scavenger. The acid scavenger may comprise, for instance, an alkaline earth metal salt. For instance, the acid scavenger may comprise a calcium salt, such as a calcium citrate. The acid scavenger may be present in an amount of from about 0.01% to about 1% by weight.

Any of the above additives can be added to the polymer composition alone or combined with other additives. In general, each additive is present in an amount less than about 5% by weight, such as in an amount less than about 2% by weight, such as in an amount less than about 1% by weight.

An almost limitless variety of polymer articles may be molded in accordance with the present disclosure. Such articles may include knobs, door handles, automotive panels, interior automotive parts such as bezels, consumer appliance parts, and the like without limitation.

Molded articles can be made according to the present disclosure using various different processes. In one embodiment, for instance, the molded articles can be formed through an injection molding process. In an alternative embodiment, the articles may be formed through a blow molding process.

Of particular advantage, molded articles made according to the present disclosure can receive a coating comprising an ink composition without having to pretreat the surface of the molded article. In this regard, the ink composition can be applied directly to the exterior surface of the molded article without having to first apply a primer coat or any type of pretreatment layer. In one embodiment, however, it may be desirable to subject the exterior surface of the molded article to a corona discharge treatment prior to applying the coating. Further, in some embodiments, applying a primer coat may be beneficial.

The present disclosure may be better understood with reference to the following example.

Example

The following tests were conducted in order to demonstrate some of the advantages and benefits of polymer compositions made according to the present disclosure. Various polymer compositions were formulated and molded into plaques. The plaques had a length of 4", a width of 3", and a thickness of ⅛". The plaques were tested for surface energy using a dyne pen. The plaques were also subjected to a pad printing process using ink compositions obtained commercially from TransTech. The ink compositions were type B pad printing ink, type B/GL pad printing ink, type PV pad printing ink, and type R pad printing ink. In particular, each ink composition had a black color and was applied to the plaques so as to produce a print with a logo and solid square on the plaque having a length of 2 cm and a width of 1.5 cm The following polymer compositions were tested:

1. Polyoxymethylene polymer wherein from about 20 to about 25% of the terminal groups were hydroxy groups. The hydroxy groups were present in the polymer in an amount of about 15 mmol/kg.
2. Polyoxymethylene polymer wherein from about 80 to about 85% of the terminal groups were hydroxy groups. The hydroxy groups were present in the polymer in an amount of about 56 mmol/kg.
3. The polyoxymethylene polymer as described in Sample Number 2 above combined with 5% by weight with a thermoplastic polyurethane elastomer and 0.5% by weight MDI.
4. The polyoxymethylene polymer as described in Sample Number 2 above combined with 18% by weight with a thermoplastic polyurethane elastomer and 0.5% by weight MDI.

The following are results of the test for surface energy.

TABLE 1

| | Surface energy (dynes/cm) |
|---|---|
| Composition | |
| Sample No. 1 | 34 |
| Sample No. 2 | 34-36 |
| Sample No. 3 | 34 |
| Sample No. 4 | 34 |
| Description | |
| Sample No. 1 w 5% Zinc Oxide | 32 |
| Sample No. 1 w 5% Novolac Resin | 32-34 |
| Sample No. 1 w 5% Polyethylene Glycol (molecular weight 35000) | 40-42 |
| Sample No. 1 w 5% Silica | 38-40 |
| Sample No. 2 w 5% Zinc Oxide | 34 |
| Sample No. 2 w 5% Novolac Resin | 32-34 |
| Sample No. 2 w 5% Polyethylene Glycol (molecular weight 35000) | 38 |
| Sample No. 2 w 5% Silica | 38 |
| Sample No. 1 w Calcium Hydroxy Stearate Filler | 48 |
| Sample No. 4 w 5% Zinc Oxide | 32-34 |
| Sample No. 4 w 5% Novolac Resin | 34 |
| Sample No. 4 w 5% Polyethylene Glycol (molecular weight 35000) | 40-42 |
| Sample No. 4 w 5% Silica | 36 |
| Sample No. 4 w 5% Alumina | 38 |

As shown above, all of the samples had approximately the same surface energy. Thus, one would expect all of the above compositions to have about the same printability characteristics. Sample Nos. 1-4 were then tested for print retention.

More particularly, after being printed with the ink compositions, the plaques were then tested according to the cross hatch tape pull test, which is ISO Test 2409. The cross hatch test assessed the resistance of paint and ink coatings to separate from a substrate when a right-angle lattice pattern is cut into the coating, penetrating through the substrate. The results of the test are either a pass or a fail.

When the cross hatch test was conducted on the samples, Sample Nos. 1 through 3 all failed the test. In fact, Sample No. 2 which contained a polyoxymethylene polymer having an elevated number of functional terminal groups performed about the same as the polyoxymethylene polymer used in Sample No. 1.

Sample No. 4, however, passed the test which contained a polyoxymethylene polymer with a significant amount of hydroxyl terminal groups in combination with a thermoplastic elastomer. This result was somewhat unexpected since the surface energy of Sample No. 4 was approximately the same as the surface energy of the other samples.

These and other modifications and variations to the present invention may be practiced by those of ordinary skill in the art, without departing from the spirit and scope of the present invention, which is more particularly set forth in the appended claims. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed:

1. A molded product comprising:

a molded article made from a polymer composition comprising a polyoxymethylene polymer blended with a thermoplastic elastomer, the polyoxymethylene polymer having terminal groups and wherein at least about 50% of the terminal groups are hydroxyl groups, the thermoplastic elastomer being present in the polymer composition in an amount of at least about 10% by weight, the polymer composition further comprising a coupling agent, the coupling agent coupling the polyoxymethylene polymer and the thermoplastic elastomer together, the molded article having an exterior surface; and a coating applied to the exterior surface of the molded article, the coating comprising an ink composition, the coating being continuous or discontinuous over the surface of the molded article.

2. A molded product as defined in claim 1, wherein the coating has been pad printed onto the exterior surface of the molded article.

3. A molded product as defined in claim 1, wherein the coupling agent comprises an isocyanate.

4. A molded product as defined in claim 1, wherein the thermoplastic elastomer comprises a thermoplastic polyurethane elastomer, the thermoplastic polyurethane elastomer being present in the polymer composition in an amount from about 10% to about 25% by weight, and wherein at least about 70% of the terminal groups of the polyoxymethylene polymer are hydroxyl groups, the polyoxymethylene polymer being present in the polymer composition in an amount of at least about 60% by weight.

5. A molded product as defined in claim 1, wherein the thermoplastic elastomer comprises a thermoplastic polyurethane elastomer.

6. A molded product as defined in claim 1, wherein the coating on the exterior surface of the molded article comprises printed matter, designs, or mixtures thereof.

7. A molded product as defined in claim 1, wherein the thermoplastic elastomer is present in the polymer composition in an amount greater than about 12% by weight.

8. A molded product as defined in claim 1, wherein the ink composition comprises a resin combined with at least one coloring agent.

9. A molded product as defined in claim 8, wherein the resin comprises a crosslinked polymer.

10. A molded product as defined in claim 8, wherein the resin comprises a polyvinyl alcohol, an epoxy, an acrylic, an acrylate, an acrylated urethane, a polyester, or a polyether.

11. A molded product as defined in claim 8, wherein the coloring agent comprises an organic or inorganic pigment.

12. A molded product as defined in claim 8, wherein the coloring agent comprises an organic or inorganic dye.

13. A molded product as defined in claim 1, wherein the thermoplastic elastomer comprises a thermoplastic polyurethane elastomer containing polycarbonate units.

14. A molded product as defined in claim 1, wherein the molded product comprises a medical device.

15. A molded product as defined in claim 1, wherein the molded product comprises an automotive part.

16. A molded product as defined in claim 1, wherein the molded product comprises a consumer appliance part.

17. A molded product as defined in claim 1, wherein the molded product comprises a sporting good.

18. A molded product as defined in claim 1, wherein the coating is directly applied to the exterior surface of the molded article.

19. A molded product as defined in claim 4, wherein the thermoplastic elastomer is present in the polymer composition in an amount greater than about 12% by weight, the ink composition comprising a resin combined with at least one coloring agent, and wherein the resin comprises a polyvinyl alcohol, an epoxy, an acrylic, an acrylate, an acrylated urethane, a polyester, or a polyether.

20. A molded product as defined in claim 18, wherein the exterior surface of the molded article has been subjected to a corona discharge treatment prior to being applied with the ink composition.

21. A molded product as defined in claim 18, wherein the coating is applied to the exterior surface of the molded article without subjecting the exterior surface to any pretreatment.

* * * * *